(12) United States Patent
Yoshida

(10) Patent No.: US 8,271,115 B2
(45) Date of Patent: Sep. 18, 2012

(54) MEDIA PLAYER AND PLAY METHOD

(75) Inventor: Hiroshi Yoshida, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 711 days.

(21) Appl. No.: 12/392,442

(22) Filed: Feb. 25, 2009

(65) Prior Publication Data

US 2009/0234476 A1     Sep. 17, 2009

(30) Foreign Application Priority Data

Mar. 11, 2008   (JP) .................................. 2008-060690

(51) Int. Cl.
*G06F 17/00*        (2006.01)
(52) U.S. Cl. .......................................................... 700/94
(58) Field of Classification Search .................... 700/94; 707/999.107; 704/500–504
See application file for complete search history.

(56) References Cited

U.S. PATENT DOCUMENTS

| 2006/0130097 A1 | 6/2006 | Lee et al. |
| 2006/0145756 A1 | 7/2006 | Lee et al. |
| 2009/0164516 A1* | 6/2009 | Svendsen et al. .......... 707/104.1 |

FOREIGN PATENT DOCUMENTS

JP         2007-226663 A      9/2007

* cited by examiner

*Primary Examiner* — Andrew C Flanders
(74) *Attorney, Agent, or Firm* — Global IP Counselors, LLP

(57) ABSTRACT

A media player includes a memory, a classification component, a content allocation component, a content acquiring component, and a content playing component. The memory stores history information having content information of a plurality of contents that were played on the media player. The classification component groups the content information of the history information into a plurality of content groups, and generates a classification list including information of the content groups. The content allocation component allocates a plurality of contents stored in a media server to the content groups, and generates a content allocation list indicating relationships between the contents stored in the media server and the content groups. The content acquiring component acquires one of the contents selected based on a user list including the classification list and the content allocation list. The content playing component plays the one of the contents.

8 Claims, 7 Drawing Sheets

PLAYBACK HISTORY H1

| CONTENT NAME | GENRE | PLAYBACK DATE | METADATA | PLAYBACK COUNT | FAVORITE DESIGNATION |
|---|---|---|---|---|---|
| MYSTERY DRAMA 1 | DRAMA | | | 1 | o |
| DRAMA SERIES 1 | DRAMA | | | 1 | |
| NIGHT GAME BROADCAST 1 | SPORTS | | | 1 | |
| NEWS 1 | NEWS | | | 1 | |
| ROBOT ANIME 1 | ANIME | | | 3 | o |
| DRAMA SERIES 2 | DRAMA | | | 1 | |
| NIGHT GAME BROADCAST 2 | SPORTS | | | 1 | |
| MYSTERY DRAMA 2 | DRAMA | | | 1 | |
| NEWS 2 | NEWS | | | 1 | |
| MYSTERY DRAMA 3 | DRAMA | | | 1 | |
| DRAMA SERIES 3 | DRAMA | | | 1 | |

*Fig. 4*

MEDIA PLAYER AND PLAY METHOD

CROSS-REFERENCE TO RELATED APPLICATIONS

This application claims priority to Japanese Patent Application No. 2008-060690 filed on Mar. 11, 2008. The entire disclosure of Japanese Patent Application No. 2008-060690 is hereby incorporated herein by reference.

BACKGROUND OF THE INVENTION

1. Field of the Invention

The present invention generally relates to a media player. More specifically, the present invention relates to a media player for playing a content acquired from a media server.

2. Background Information

In a conventional media player, a desired content is played by acquiring content information from a media server and retrieving the desired content based on the content information. The media server stores mystery drama, drama series, robot anime, and numerous other contents, for example.

With the conventional media player, digital contents are stored in a plurality of files that are set up by a user. Thus, the user has to manage the contents, which requires time and labor and is troublesome. In particular, managing the contents is troublesome if the number of the contents increases.

With another conventional media player, attribute information imparted to numerous contents stored in a media server is acquired (see Japanese Laid-open Patent Publication No. 2007-226663, for example). Furthermore, a content cluster is generated in advance. Then, a user selects a single content cluster and specifies a desired content from a content display screen of the content cluster.

In the conventional media player, clustering is performed based on the attribute information. However, viewing tendencies according to a user's preference are not reflected in the clustering. Thus, labor and time are required to retrieve the desired content that matches the user's preference.

There is also a technique in which a content that matches a user's preference is retrieved based on a play count or other playback history that is stored in the media server. However, the user's preference is not reflected when a certain media player is connected to a different media server.

Furthermore, even when favorite settings are registered in the media player, the favorite settings apply only to a specific content in a specific media server, and are not applicable when the same content is present in another media server.

In view of the above, it will be apparent to those skilled in the art from this disclosure that there exists a need for an improved disk device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a media player with which a content that matches a user's preference can easily be retrieved.

In accordance with one aspect of the present invention, a media player includes a memory, a classification component, a content allocation component, a content acquiring component, and a content playing component. The memory is configured to store history information having content information of a plurality of contents that were played on the media player. The classification component is configured to group the content information of the history information into a plurality of content groups, and generate a classification list including information of the content groups. The content allocation component is configured to allocate a plurality of contents stored in a media server to the content groups, and generate a content allocation list indicating relationships between the contents stored in the media server and the content groups. The content acquiring component is configured to acquire one of the contents stored in the media server with the one of the contents being selected based on a user list including the classification list and the content allocation list. The content playing component is configured to play the one of the contents acquired from the media server.

With the media player of the present invention, it is possible to provide a media player with which a content that matches a user's preference can easily be retrieved.

These and other objects, features, aspects and advantages of the present invention will become apparent to those skilled in the art from the following detailed descriptions, which, taken in conjunction with the annexed drawings, disclose a preferred embodiment of the present invention.

BRIEF DESCRIPTION OF THE DRAWINGS

Referring now to the attached drawings which form a part of this original disclosure:

FIG. 4 is a schematic diagram illustrating a playback history list;

DETAILED DESCRIPTION OF THE PREFERRED EMBODIMENT

A preferred embodiment of the present invention will now be explained with reference to the drawings. It will be apparent to those skilled in the art from these disclosures that the following descriptions of the preferred embodiment of the present invention is provided for illustration only and not for the purpose of limiting the invention as defined by the appended claims and their equivalents.

Figure 1:
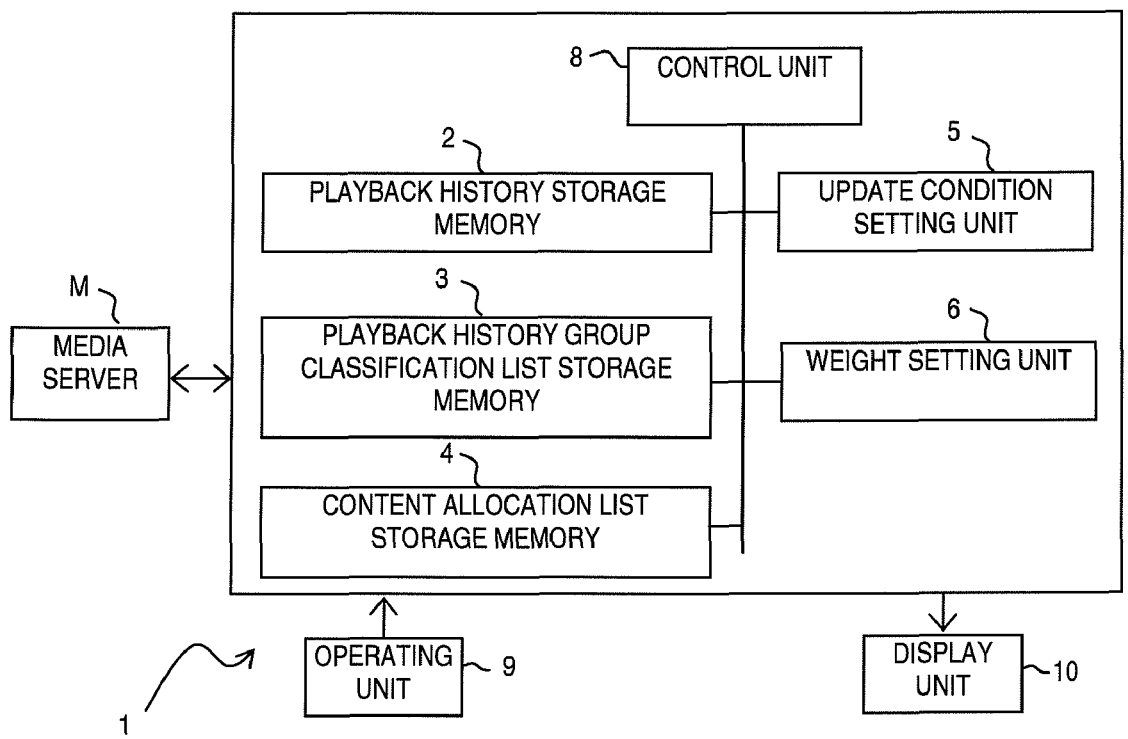
FIG. 1 is a block diagram illustrating a media player in accordance with one embodiment of the present invention.

As shown in FIG. 1, a media player 1 has a playback history storage memory (e.g., memory) 2, a playback history group classification list storage memory 3, a content allocation list storage memory 4, an update condition setting unit (e.g., update condition setting component) 5, a weight setting unit (e.g., weight setting component) 6, a control unit 8, an operating unit 9 and a display unit 10. The playback history storage memory 2, the playback history group classification list storage memory 3, and the content allocation list storage memory 4 includes flash memory. The control unit 8 includes a central processing unit (CPU). The control unit 8 controls the playback history storage memory 2, the playback history group classification list storage memory 3, the content allocation list storage memory 4, the update condition setting unit 5, the weight setting unit 6, and the display unit 10 based on inputs from the operating unit 9.

As shown in FIG. 1, the operating unit 9 and the display unit 10 are connected to the control unit 8. The operating unit 9 includes a plurality of selector keys, operating buttons, and the like. The display unit 10 includes a liquid crystal monitor or the like. The media player 1 communicates with a media server M via network, such as the Internet. The media server M stores numerous digital contents such as video and audio. The video includes mystery drama, drama series, robot anime, and the like, for example. The media player 1 acquires one of the contents from the media server M and plays the acquired content.

The playback history storage memory 2 stores a playback history H1 indicating the contents played in the past by the media player 1. The playback history H1 is updated and stored when the media player 1 retrieves the content from the media server M and plays the content.

FIG. 4 shows the playback history H1. The playback history H1 includes content information of each of the contents played in the past by the media player 1. Each of the content information includes information indicating "content name," "genre," "playback time," "metadata," "playback count," and "favorite designation (or favorite setting)" for each of the contents played in the past. The "metadata" includes program information (EPG), a content ID for identifying the content (program), and the like.

Figure 5:
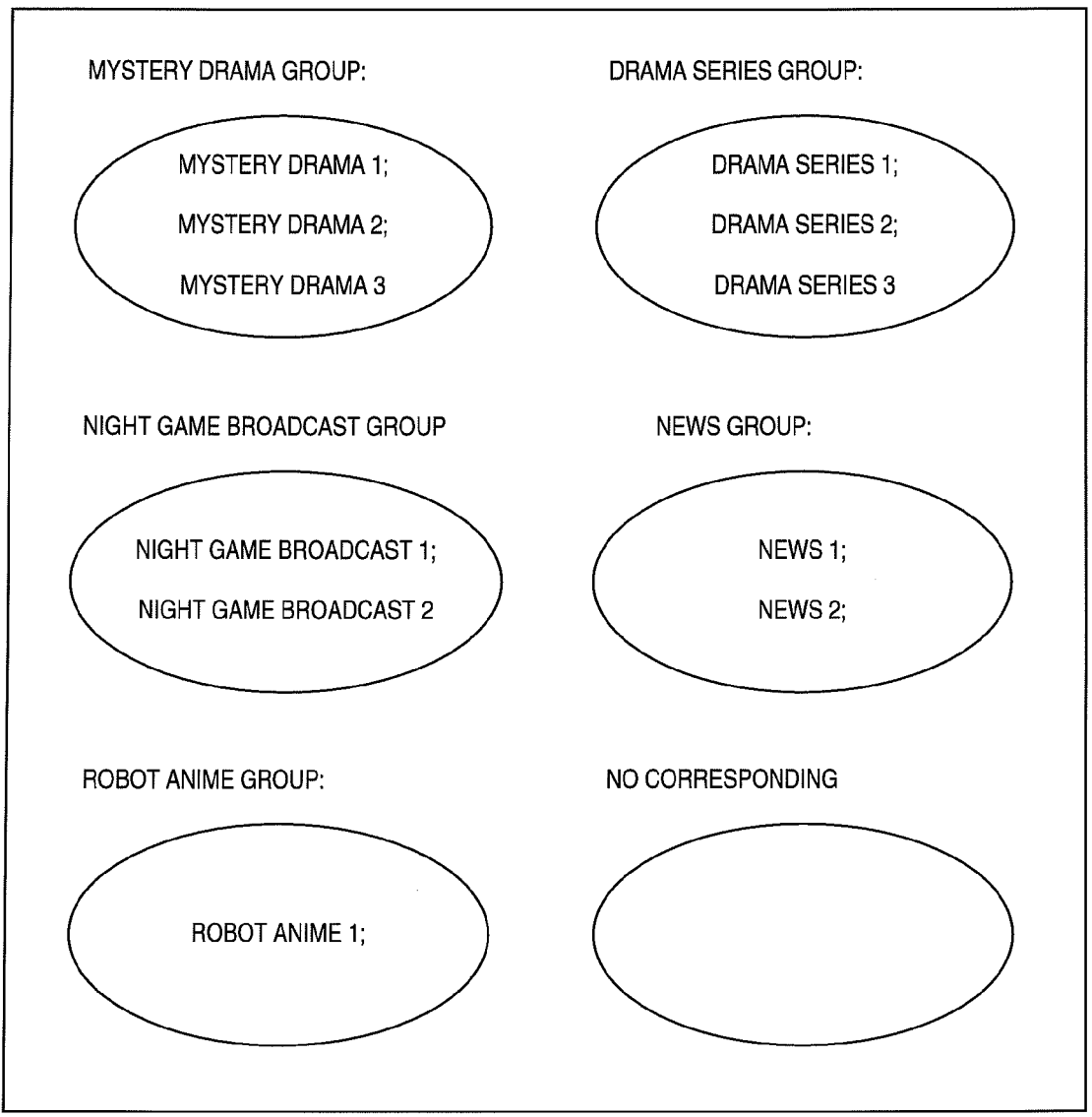
FIG. 5 is a schematic diagram illustrating a playback history group classification list.

As shown in FIG. 5, the playback history group classification list storage memory 3 stores a playback history group classification list T1. The playback history group classification list T1 is formed by clustering of the playback history H1.

Figure 6:
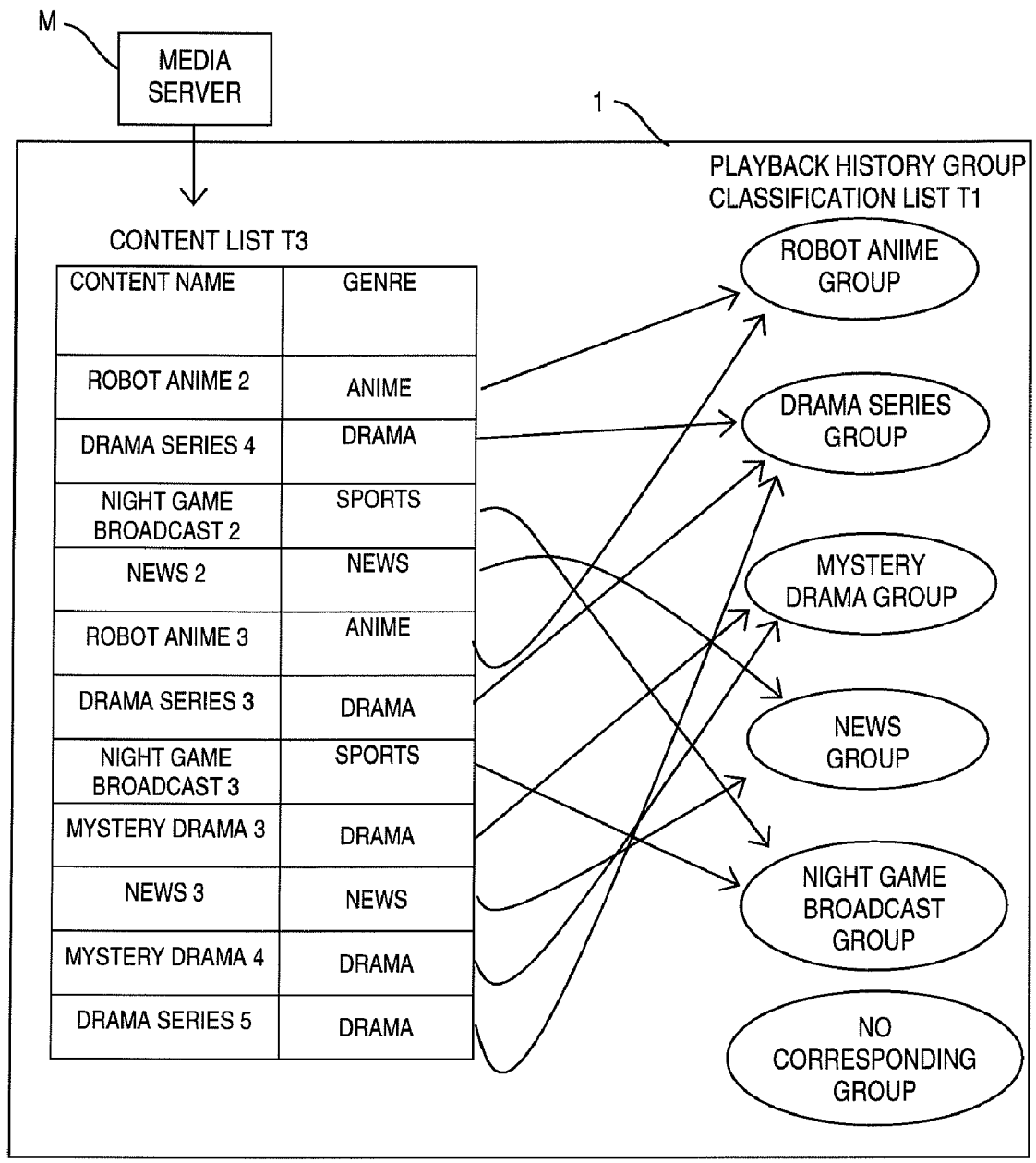
FIG. 6 is a schematic diagram illustrating a user list generating process of the media player illustrated in FIG. 1.
Figure 7:
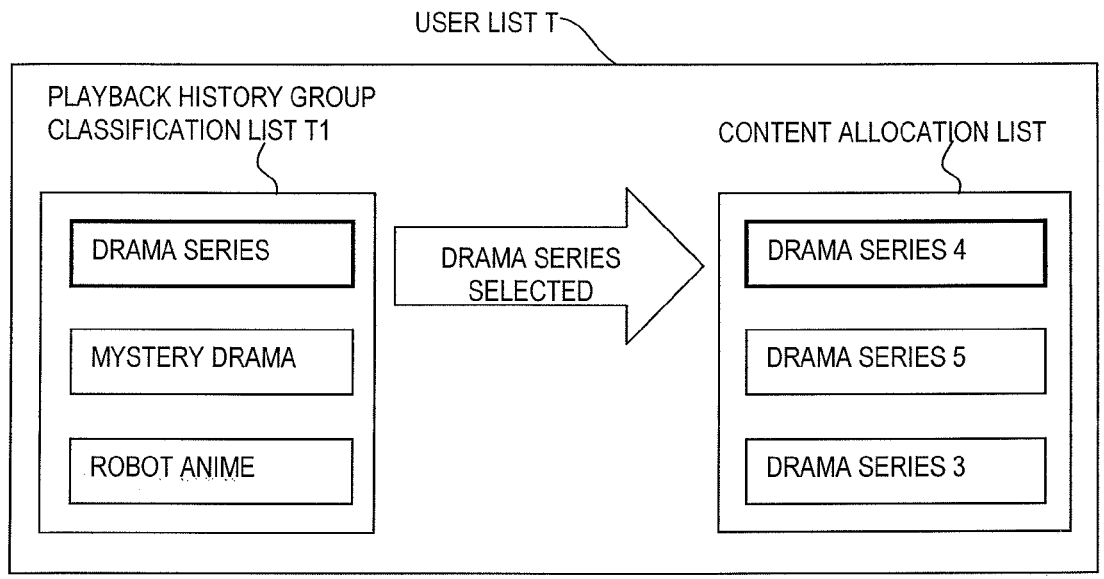
FIG. 7 is a schematic diagram illustrating a playback process of the media player illustrated in FIG. 1.

As shown in FIG. 7, the content allocation list storage memory 4 stores a content allocation list T2. As shown in FIG. 6, the content allocation list T2 is formed by allocating the contents stored in the media server M to the playback history group classification list T1.

The update condition setting unit 5 is operated by the operating unit 9. The update condition setting unit 5 sets an update condition (update period, update timing or the like) of a user list T. The user list T includes the playback history group classification list T1 and the content allocation list T2, as shown in FIG. 7.

As shown in FIG. 4, the weight setting unit 6 weights the contents when clustering of the playback history H1 is performed. Specifically, the weight setting unit 6 assigns a flag (e.g., weight information) "○" to the "favorite designation" of the contents that are set as favorite contents.

Figure 8:
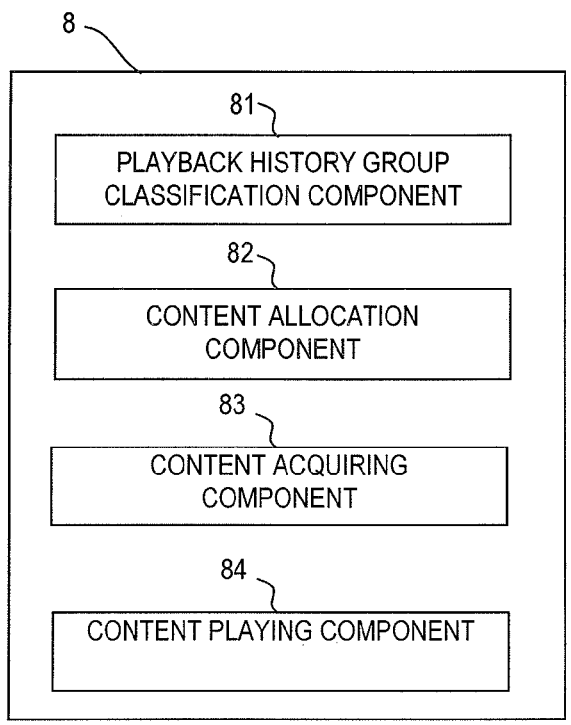
FIG. 8 is a functional block diagram illustrating a control unit of the media player illustrated in FIG. 1.

As shown in FIG. 8, the control unit 8 includes a playback history group classification component (e.g., classification component) 81, a content allocation component 82, a content acquiring component 83 and a content playing component 84. The playback history group classification component 81 groups the content information of the history information H1 into a plurality of groups, and generates the playback history group classification list T1. The content allocation component 82 allocates the contents stored in the media server M to the groups, and generates the content allocation list T2. The content acquiring component 83 acquires one of the contents that is stored in the media server M and is selected based on the user list T. The content playing component 84 plays the content acquired from the media server M.

Specifically, the playback history group classification component 81 recalls and acquires the playback history H1 from the playback history storage memory 2. Then, the playback history group classification component 81 clusters the playback history H1. Furthermore, the playback history group classification component 81 creates the playback history group classification list T1. Specifically, in the clustering, the degree of similarity between the contents played in the past is calculated using an N-gram method, an morphological analysis, or the like based on the content information (content name, genre, and other information) in the playback history H1. In particular, the degree of similarity is digitalized, contents having numerically close content information (content name, for example) are automatically grouped (or classified) to make the groups. Then, the playback history group classification component 81 performs syntactic analysis of the content information (content names, for example) of the contents that are grouped in each of the groups to extract a group name. Then, the group name extracted by the syntactic analysis is automatically given to each of the groups. Specifically, as shown in FIG. 5, the group names, such as "Mystery Drama Group", "Drama Series Group", "Night Game Broadcast Group", "News Group", "Robot Anime Group", and "No Corresponding Group", are given to each of the groups, and are stored in the playback history group classification list T1.

The N-gram method is a method for breaking down a retrieval target into certain N letter units rather than word units, and calculating the frequency at which the units appear. For example, the 4-grams that can be generated from the content name "Night Game Broadcast 1" are "Nigh", "ight", "ght ", "ht G", "t Ga", "Gam", "Game", "ame ", "me B" and so forth.

The morphological analysis is an operation for breaking down a language into a series of morphemes (generally speaking, minimal units that have meaning in a language) and determining parts of speech.

The content allocation component 82 acquires a content list T3 from the media server M. The content list T3 includes content information of each of the contents that are stored in the media server M. Each of the content information includes information indicating "content name," and "genre," as shown in FIG. 6. However, the content information can includes the same kinds of information as the content information stored in the playback history H1. The content allocation component 82 calculates the degree of similarity of the contents acquired from the content list T3 of the media server M. Specifically, the content allocation component 82 calculates the degree of similarity between the content information in the content list T3 and the content information of the contents grouped in the groups or the group names of the groups. Then, the content allocation component 82 allocates each of the content information of the content list T3 to respective one of the groups in the playback history group classification list T1 that is determined to have similar content information or group name to each of the content information of the content list T3. As a result, the content allocation component 82 forms the content allocation list T2 having relationships between the group names stored in the playback history group classification list T1 and the content information of the contents stored in the media server M. Calculation of the degree of similarity is substantially the same as the calculation performed in the playback history group classification component 81, and therefore will not be described. As a result, the user list T having the playback history group classification list T1 and the content allocation list T2 is formed.

Figure 2:
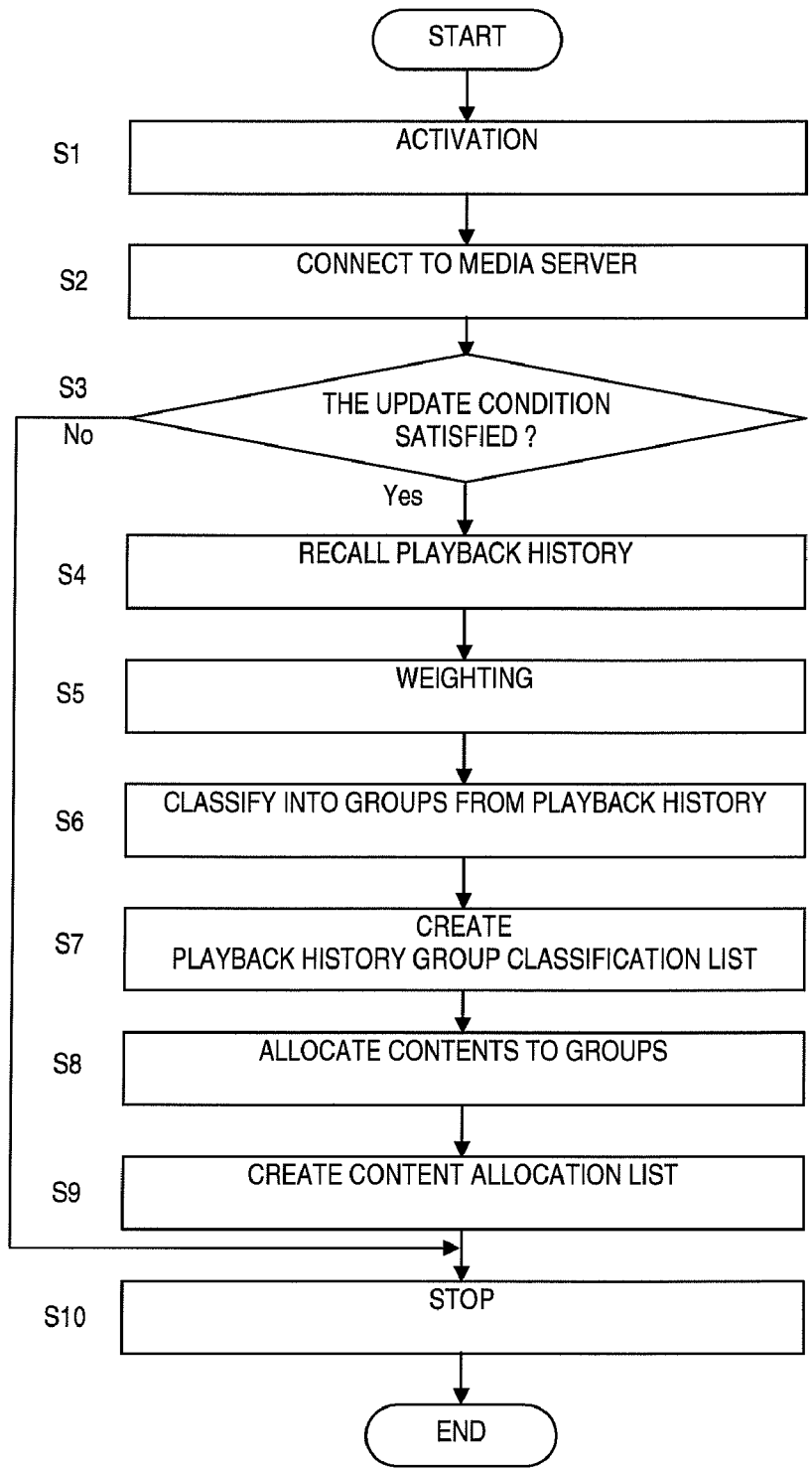
FIG. 2 is a flow chart illustrating a user list generating process of the media player illustrated in FIG. 1.

A user list generating process will be described based on FIG. 2. The user list generating process forms the user list T by control of the control unit 8. Prior to the user list generating process, the playback history H1 is generated and stored in the playback history storage memory 2, as shown in step S16 of FIG. 3. When the media player 1 is activated (step S1), the media player 1 is connected to the media server M (step S2). Then, the control unit 8 determines whether the update condition of the user list T is satisfied (step S3). Specifically, the control unit 8 acquires the updated period set by the update condition setting unit 5, and determines whether the updated period has elapsed since the user list T was updated last time. If 30 days, for example, is set as the update period, then the user list generating process proceeds to the next step S4 after 30 days have passed. On the other hand, if 30 days have not passed, then the user list generating process proceeds to step S10, and the user list T is not updated.

The user list T can be updated each time the media player 1 is started. However, the user list generating process places a burden on the media player 1, and there is almost no change in a user's preference in a short time. On the other hand, if an update period of 30 days, for example, is set as the update condition, then the user list T is only updated after 30 days has elapsed. In this case, the burden on the media player 1 can be reduced, and practicality can be increased.

When the control unit 8 determines that the update condition is satisfied ("Yes" in step S3), the playback history H1 is recalled from the playback history storage memory 2 (step S4). Then, weighting on the contents is performed by the weight setting unit 6 (step S5). Specifically, as shown in FIG. 4, the flag "○" is given as the "favorite designation" weighting mark.

Even if a particular content is considered to be important for the user, the particular content can be classified in the "No Corresponding Group" when the number of contents similar to the particular content is small (see FIG. 5). However, by using the weighting, the particular content can be listed as an independent group in the playback history group classification list T1 (see FIG. 5) even when the number of contents similar to the particular content is small. For example, as shown in FIG. 5, by weighting "robot anime 1," the content can be grouped independently as the "Robot Anime Group."

Furthermore, the playback history H1 is clustered (step S6). In the clustering, the degree of similarity between the contents is calculated using the N-gram method, the morphological analysis, or the like based on the content information (content name, genre, and other information) stored in the playback history H1. Specifically, the degree of similarity is digitalized, the contents that are numerically close are automatically grouped, and the group name extracted by the syntactic analysis is automatically given to each of the groups. As a result, the playback history group classification list T1 is created (step S7), and the playback history group classification list T1 is stored in the playback history group classification list storage memory 3.

During grouping, grouping for a content is not performed when the number of contents similar to the content is small. However, when a content having a high play count or the "favorite designation" is present, grouping for the content is generally performed even when the number of contents similar to the content is small.

In the playback history group classification list T1 shown in FIG. 5, the contents in the playback history H1 is grouped into "Mystery Drama Group," "Drama Series Group," "Night Game Broadcast Group," "News Group," "Robot Anime Group," and "No Corresponding Group."

Then, as shown in FIG. 6, each of the content information in the content list T3 is allocated to the groups shown in the playback history group classification list T1 (step S8). As a result, the content allocation list T2 is formed (step S9). The content allocation list T2 is stored in the content allocation list storage memory 4. Then, the user list T is generated, and the user list generating process is completed (step S10).

During allocation of the content information to the groups, the degree of similarity between the groups in the playback history group classification list T1 and the content information of the contents in the content list T3 is calculated, and the content information of the contents stored in the media server M is allocated to the groups. It is not necessary to allocate all of the contents to the groups. In other words, only contents having similarity to the groups can be allocated to the groups. The contents that do not have similarity to any of the groups can be allocated in "no corresponding group." Calculation of the degree of similarity is substantially the same as the calculation performed by the playback history group classification component 81, and therefore will not be described.

Figure 3:
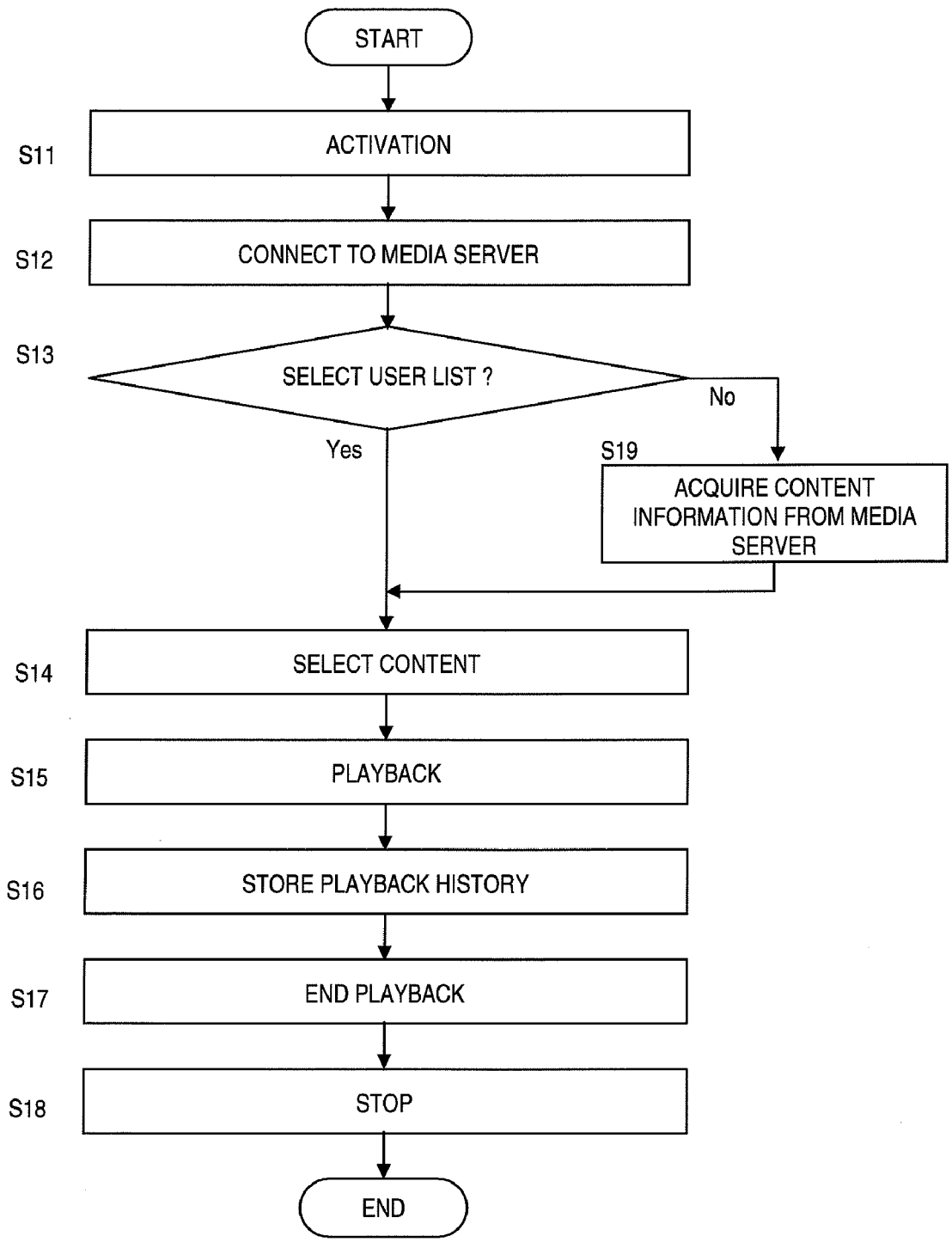
FIG. 3 is a flow chart illustrating a playback process of the media player illustrated in FIG. 1.

A playback process by the control of the control unit 8 will be described based on FIG. 3. When the media player 1 is activated (step S11), the media player 1 is connected to the media server M (step S12). Then, the control unit 8 determines whether the user wish to select a desired content to be played based on the user list T or not (step S13). Specifically, the control unit 8 displays a window on the display unit 10 to prompt the user to input whether the user wish to select the desired content based on the user list T or not.

If the user list T is selected ("Yes" in step S13), then the process proceeds to step S14 to select a desired content based on the user list T. Specifically, as shown in FIG. 7, the playback history group classification list T1 is displayed on the display unit 10. When the user selects a desired group name ("drama series," for example) from the playback history group classification list T1, the content names allocated to the desired group name in the content allocation list T2 is displayed on the display unit 10, as shown in FIG. 7. Then, the user selects the desired content ("drama series 4," for example) from the content allocation list T2.

If the user list T is not selected ("No" in step S13), then the process proceeds to step S19. Specifically, content information (e.g., the content list T3) is acquired from the media server M as in the conventional technique (step S19). Then, the process proceeds to step S14, and the desired content is selected based on the content information acquired from the media server M.

When the desired content is selected (step S14), the content acquiring component 83 acquires the desired content from the media server M, and the content playing component 84 plays the desired content (step S15). During playback, the playback history H1 is updated and stored in the playback history storage memory 2 (step S16). When the playback is ended (step S17), the playback process ends, and the media player 1 is stopped (step S18).

The desired content is selected and played based on the user list T having the playback history group classification list T1 and the content allocation list T2. The viewing tendencies according to the user's preference are reflected in the user list T. Thus, contents that match the user's preference can be easily retrieved from the media server M.

Since the playback history H1 is stored in the playback history storage memory 2, the playback history H1 can be effectively utilized to reflect the user's preference even when the media player 1 is connected to a different media server M.

Furthermore, in addition to selecting the desired content based on the content information acquired from the media server M, the user can select and play the desired content based on the user list T. Thus, the user can select the desired content based on two different ways as needed. Thus, the media player 1 becomes more convenient.

The user list generating process can be performed in advance of the playback process. Furthermore, the user list generating process can also be performed simultaneously and in parallel to the playback process. Specifically, the steps S3-S9 of user list generating process can be performed after the user list T is selected ("Yes" in step S13). Moreover, the user list generating process can be performed between two playback processes or in the free time before and after playbacks of the contents. The media player 1 can be effectively utilized, and the load placed on the media player 1 can be reduced.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A media player comprising:
   a memory configured to store history information having content information of a plurality of contents that were played on the media player;
   a classification component configured to group the content information of the history information into a plurality of content groups, and generate a classification list including information of the content groups;
   a content allocation component configured to acquire a content list from a media server that communicates with the media player via a network, with the content list having content information of a plurality of stored contents that are stored in the media server, the content allocation component being further configured to allocate the content information of the stored contents in the content list acquired from the media server to the content groups of the classification list, respectively, such that the content allocation component generates a content allocation list indicating relationships between the stored contents stored in the media server and the content groups;
   a content acquiring component configured to acquire one of the stored contents stored in the media server with the one of the stored contents being selected based on a user list including the classification list and the content allocation list; and
   a content playing component configured to play the one of the stored contents that has been acquired from the media server.

2. A media player comprising:
   a memory configured to store history information having content information of a plurality of contents that were played on the media player;
   a classification component configured to group the content information of the history information into a plurality of content groups, and generate a classification list including information of the content groups;
   a content allocation component configured to acquire a content list from a media serve with the content list having content information of a plurality of contents that are stored in the media server, allocate the content information of the contents stored in the media server to the content groups of the classification list, respectively, and generate a content allocation list indicating relationships between the contents stored in the media server and the content groups;
   a content acquiring component configured to acquire one of the contents stored in the media server with the one of the contents being selected based on a user list including the classification list and the content allocation list;
   a content playing component configured to play he one of the contents acquired from the media server; and
   a weight setting component configured to set weight information to the content information of the history information,
   the classification component being configured to group the content information of the history information based on the weight information such that the content information to which the weight information has been set independently forms an independent content group.

3. The media player according to claim 1, further comprising
   an update condition setting component configured to set an update condition of the user list.

4. The media player according to claim 2, further comprising
   an update condition setting component configured to set an update condition of the user list.

5. A play method for playing a content on a media player, comprising:
   providing history information having content information of a plurality of contents that were played on the media player;
   grouping the content information of the history information into a plurality of content groups;
   generating a classification list including information of the content groups;
   the media player acquiring a content list from a media server that communicates with the media player via a network, with the content list having content information of a plurality of stored contents that are stored in the media server;
   the media player allocating the content information of the stored contents in the content list acquired form the media server to the content groups of the classification list, respectively to generate a content allocation list indicating relationships between the stored contents stored in the media server and the content groups;
   acquiring one of the stored contents stored in the media server with the one of the stored contents being selected based on a user list including the classification list and the content allocation list; and
   playing the one of the stored contents that has been acquired from the media server.

6. The play method according to claim 5, further comprising
   determining whether the one of the stored, contents that has been acquired from the media server is selected based on the user list or not, the acquiring of the one of the stored contents stored in the media server further including acquiring the one of the stored contents that is selected based on the user list upon determining that the one of the stored contents is selected based on the user list, and acquiring the one of the stored contents that is selected based on content information of the stored contents stored in the media server upon determining that the one of the stored contents is not selected based on the user list.

7. The play method according to claim 6, further comprising updating the history information based on the one of the stored contents that has been played on the media player.

8. The play method according to claim 7, further comprising connecting to the media server.

* * * * *